United States Patent
Phillips

(10) Patent No.: US 7,390,248 B2
(45) Date of Patent: Jun. 24, 2008

(54) METHOD FOR MANUFACTURING FORMED LUMPS OF MEAT

(75) Inventor: Stephen B. Phillips, Arnold, MD (US)

(73) Assignee: Phillips Foods, Inc., Baltimore, MD (US)

( * ) Notice: Subject to any disclaimer, the term of this patent is extended or adjusted under 35 U.S.C. 154(b) by 58 days.

(21) Appl. No.: 11/536,301

(22) Filed: Sep. 28, 2006

(65) Prior Publication Data

US 2008/0081547 A1    Apr. 3, 2008

(51) Int. Cl.
*A22C 18/00* (2006.01)

(52) U.S. Cl. .................................... 452/174

(58) Field of Classification Search ........... 426/643, 426/646, 389, 512, 523; 452/174, 198
See application file for complete search history.

(56) References Cited

U.S. PATENT DOCUMENTS

| | | | |
|---|---|---|---|
| 3,325,856 A | | 6/1967 | Pack et al. |
| 3,863,017 A | * | 1/1975 | Yueh .......................... 426/643 |
| 4,158,065 A | | 6/1979 | Sugino |
| 4,303,688 A | | 12/1981 | Shimura et al. |
| 4,483,046 A | * | 11/1984 | Briddell ...................... 425/556 |
| 4,559,236 A | | 12/1985 | Okada |
| 4,646,385 A | * | 3/1987 | Roberts et al. ............... 426/513 |
| 4,692,341 A | | 9/1987 | Ikeuchi et al. |
| 4,888,181 A | * | 12/1989 | Gray et al. ................... 426/643 |
| 5,028,445 A | * | 7/1991 | Wu et al. ..................... 426/574 |
| 6,159,528 A | * | 12/2000 | Gallant et al. ............... 426/643 |
| 6,235,338 B1 | * | 5/2001 | Gallant et al. ............... 426/643 |

FOREIGN PATENT DOCUMENTS

JP    60 237968 A    11/1985

OTHER PUBLICATIONS

International Search Report mailed on Feb. 21, 2008 for International Application No. PCT/US2007/015128 filed on Jun. 29, 2007, 3 pages.
Written Opinion of the International Searching Authority mailed on Feb. 21, 2008 for International Application No. PCT/US2007/015128 filed on Jun. 29, 2007, 4 pages.

* cited by examiner

*Primary Examiner*—Thomas Price
(74) *Attorney, Agent, or Firm*—Sterne, Kessler, Goldstein & Fox P.L.L.C.

(57) ABSTRACT

A formed lump of crab meat is manufactured by placing pieces of crab meat into a mold, compressing the crab meat and cooking the crab meat. The crab meat placed in the mold is a mixture of raw crab meat and cooked crab meat. The cooked crab meat has a texture and is placed in the mold so that the texture of the individual pieces are aligned. The formed lump is 100% crab meat.

12 Claims, 3 Drawing Sheets

METHOD FOR MANUFACTURING FORMED LUMPS OF MEAT

BACKGROUND OF THE INVENTION

1. Field of the Invention

The present invention relates to a method of molding pieces of meat, such as crab meat, into formed lumps.

2. Background Art

Jumbo lumps of certain meat, such as crab meat for example, are more commercially valuable and command a higher sales price than smaller lumps or loose flakes thereof. In the instance of crab meat, in order to get the jumbo lumps of meat from the two back fins of the crab, professional pickers are required who have acquired the skill of removing the jumbo lumps intact. Having professional pickers remove jumbo lumps intact is costly and time consuming, so processes for molding smaller pieces of meat together to create formed jumbo lumps have been developed.

U.S. Pat. No. 4,646,385 to Roberts et al. discloses feeding loose meat into a hopper which is then discharged into cavities of a mold plate for forming the loose meat into lumps.

U.S. Pat. No. 4,483,046 to Briddell discloses placing a mixture of partially cooked and substantially cooked crab meat into die cavities for molding the mixture of crab meat particles into a lump.

U.S. Pat. No. 3,863,017 to Yueh discloses preparing fabricated seafood products, such as shrimp and lobster tail. A mixture of partially cooked fish and a paste of finely comminuted fresh fish are formed into a desired shape.

The present invention differs from the processes described in the aforementioned patents in that formed lumps of pure meat are prepared without the use of a paste or binder containing other substances and the formed lumps are prepared using a mixture of cooked meat and raw meat.

BRIEF SUMMARY OF THE INVENTION

In a preferred embodiment of the present invention a mixture of raw crab meat and cooked crab meat is placed into a mold, the mixture is compressed and the mixture is cooked to make a formed lump of crab meat.

BRIEF DESCRIPTION OF THE DRAWINGS/FIGURES

DETAILED DESCRIPTION OF THE INVENTION

The present invention can be utilized to mold pieces of crab meat or other seafood into jumbo formed lumps and is particularly useful in forming flakes of crab meat into formed jumbo lumps. As crab meat is the preferred species of meat, the invention will be described referring to crab meat. However, the invention is not limited to crab meat and is readily adaptable to any species of seafood, such as scallops or shrimp.

Figure 1:
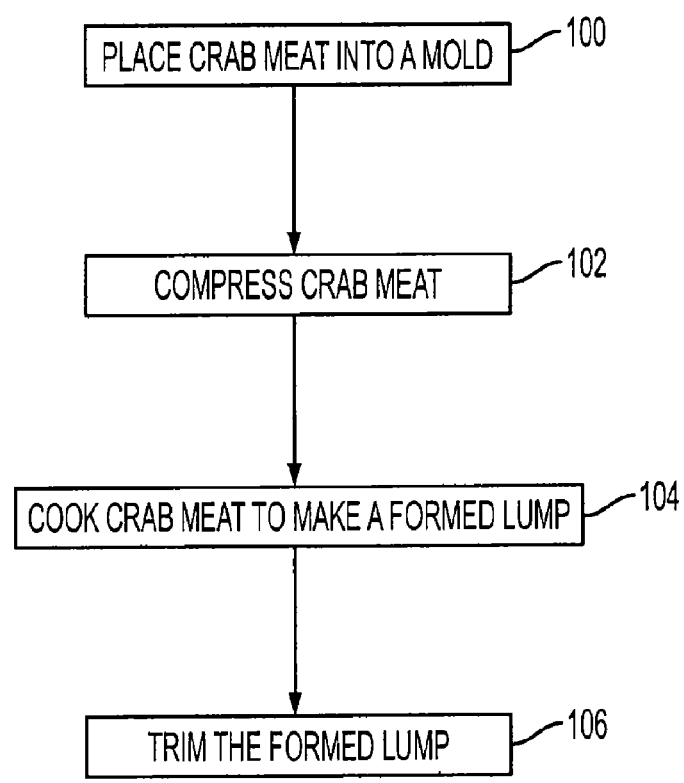
FIG. 1 is a flow chart outlining the steps for manufacturing a formed lump of meat according to the present invention.

The method for making a formed lump of crab meat will be discussed with reference to the general outline presented in the flow chart of FIG. 1. It is noted that the flow chart of FIG. 1 is exemplary and can include additional steps, as needed or appropriate.

Figure 2:
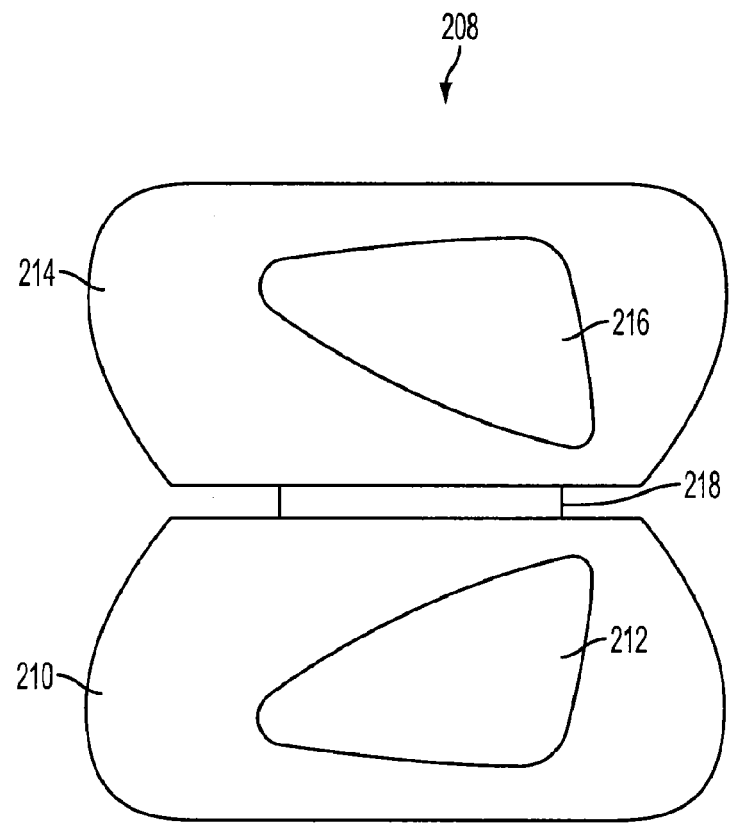
FIG. 2 is plan view of an open mold for forming a lump of meat.
Figure 3:
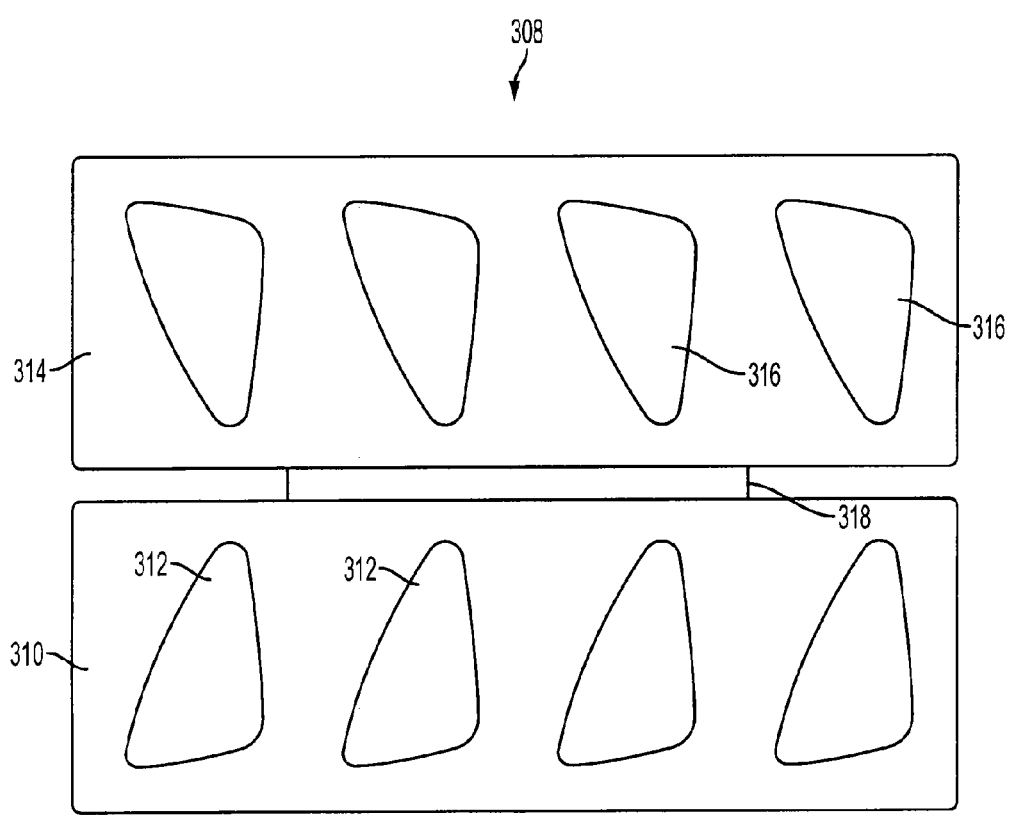
FIG. 3 is a plan view of an alternate embodiment of an open mold for forming a lump of meat.

As indicated in step 100, pieces of crab meat are placed in a mold. FIG. 2 illustrates an exemplary mold 208 for utilization in the present invention. Mold 208 has a lower mold 210 with a lower mold cavity 212 and an upper mold 214 with an upper mold cavity 216. While lower and upper molds 210, 214 in FIG. 2 only illustrate a single lower mold cavity 212 and a single upper mold cavity 216, lower and upper molds 210, 214 can have a plurality of mold cavity pairs to form a plurality of formed lumps in a batch as shown for example in FIG. 3. Lower and upper mold cavities 212, 216 are sized to the desired dimensions of the formed lump. It is preferred to form jumbo lumps of crab meat in the range of 6 to 10 grams in weight. The crab meat is placed in either lower mold cavity 212, upper mold cavity 216 or both.

Lower and upper molds 210, 214 preferably are made of stainless steel, although other materials known to a person of ordinary skill in the art could also be utilized, such as, for example aluminum or polytetrafluoroethylene (PTFE). Preferably, lower and upper mold cavities 212, 216 have non-stick surfaces such as polytetrafluoroethylene (PTFE). Lower mold 210 and upper mold 214, are preferably connected with a hinge 218, however, other configurations known in the art can also be utilized in accordance with the present invention. Upper mold 214, also preferably has a clasp, clip or other closing means that attaches to lower mold 210 forcing upper mold 214 and lower mold 210 together, thereby providing pressure to the crab meat therein.

Crab meat placed in the mold is a mixture of cooked crab meat in the form of flakes and raw crab meat in the form of a paste. In a preferred embodiment, the mixture comprises about 25% raw crab meat and 75% cooked crab meat. In an alternate embodiment, all the crab meat placed in the mold can be cooked crab meat. The cooked crab meat can be selected from broken jumbo crab meat, special crab meat, back fin crab meat and undersized jumbo lumps. The raw crab meat can be selected from white crab meat, claw and claw knuckle. In a preferred embodiment, the flakes of cooked crab meat are lined up in the mold such that the texture of the flakes of crab meat are aligned in the same direction. This process is preferably done by hand because it results in a high quality formed lump. If the cooked crab meat does not have a red knuckle then a red knuckle from claw crab meat may be added to the mold. Subsequently a paste of raw crab meat is applied to fill the remainder of the mold cavities. It is also preferred that the formed lumps be 100% crab meat, so only crab meat is placed in the mold and no binder, fillers, starches or other substances, are placed in the mold.

In step 102, the crab meat is compressed between lower and upper molds 210, 214 to form the lump of crab meat to the desired shape by moving upper mold 214 about hinge 218 to place upper mold 214 over lower mold 210 or by otherwise moving lower and upper molds 210, 214 relative to one another to press the crab meat therebetween. The pressure causes the raw crab meat paste to stick to the cooked crab meat flakes and hold the formed lump together. Additional pressure may be applied to the mold 208 by an external force, such as, for example a pressing device. In a preferred embodiment the jumbo formed lumps of crab meat are formed in the range of 6 to 10 grams in weight.

In step 104, the crab meat is cooked to coagulate the crab meat to maintain the shape of the formed lump. The cooking step 104 can occur simultaneously with or after the compressing step 102. If the cooking step 104 occurs after the compressing step 102, the crab meat can be cooked either inside or outside the mold. In a preferred embodiment, the crab meat is compressed and then the compression is maintained during the cooking step. When a mixture of raw and cooked crab meat is placed in the mold the mixture is preferably cooked for approximately 5 to 7 minutes at approximately 100° C. This cooking time and temperature is merely exemplary and can be varied as would be apparent to one of ordinary skill in the art as long as the crab meat is coagulated. Cooking step 104 can be performed through conventional means, such as, for example, in an oven or boiling in water or steam.

In step 106 the formed lump of crab meat is trimmed to the desired shape. Preferably the trimming is performed after allowing the formed lump of crab meat to cool. The trimming can be performed using any conventional method, such as by hand with a knife. The cooling can occur before or after the formed lump is removed from the mold and can be performed through conventional means, such as, for example, air cooling or dipping the mold in cold water or a combination thereof.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for making a formed lump of crab meat comprising the steps of:
    placing a mixture of raw crab meat and cooked crab meat into a mold;
    compressing the mixture; and
    cooking the mixture to make a formed lump of crab meat.

2. The method of claim 1, wherein the formed lump of crab meat is 100% crab meat.

3. The method of claim 1, wherein the mixture of raw and cooked crab meat comprises:
    about 25% raw crab meat and about 75% cooked crab meat.

4. The method of claim 1, wherein the cooked crabmeat has a texture and wherein placing the mixture into the mold further comprises aligning the texture of the cooked crab meat in the mold.

5. The method of claim 1, wherein the cooked crab meat comprises pieces selected from the group consisting of broken jumbo crab meat, special crab meat and back fin crab meat.

6. The method of claim 1, wherein the raw crab meat comprises pieces selected from the group consisting of white crab meat, claw and claw knuckle.

7. The method of claim 1, wherein the cooking step is approximately 7 minutes.

8. The method of claim 1, further comprising cooling the formed lump of crab meat.

9. The method of claim 8, further comprising removing the formed lump of crab meat from the mold after cooling.

10. The method of claim 8, further comprising trimming the formed lump of crab meat after cooling.

11. The method of claim 1, wherein the cooking step occurs in the mold.

12. The method of claim 1, wherein the formed lump weighs from about 6 grams to about 10 grams.

* * * * *